3,632,624
DIALKYL CARBONATE PREPARATION
John E. Anderson, Clyde E. Parish, and George H. Ross, Houston, Tex., assignors to The Signal Companies, Inc.
No Drawing. Continuation-in-part of application Ser. No. 592,749, Nov. 8, 1966, now Patent No. 3,502,706, which is a continuation-in-part of abandoned application Ser. No. 372,409, June 3, 1964. This application Dec. 11, 1967, Ser. No. 689,247
Int. Cl. C07c 69/00
U.S. Cl. 260—463
8 Claims

ABSTRACT OF THE DISCLOSURE

Dialkyl carbonates are prepared by a new process comprising mixing together carbonyl sulfide, an amine and an alkanol and oxidizing the resulting mixture.

---

This application is a continuation-in-part of copending application, Ser. No. 592,749 filed Nov. 8, 1966, now Pat. No. 3,502,706, which was a continuation-in-part of copending application Ser. No. 372,409, filed June 3, 1964 now abandoned.

The present invention generally relates to organic compounds and to an improved method of preparing the same and more particularly relates to selected intermediates, dialkyl carbonates formed from selected intermediates and to improved methods of preparing selected intermediates and dialkyl carbonates.

Dimethyl carbonate, better known as methyl carbonate, which has the structural formula CH₃OCOOCH₃, is a well known reagent in the organic synthesis of various chemicals, and is usually prepared by interaction of phosgene and methyl alcohol. However, phosgene is relatively expensive and extremely toxic, having been used as a war gas. Accordingly, such method of preparation of methyl carbonate is expensive and may be hazardous.

Various other dialkyl carbonates can also be prepared for use in a variety of organic synthesis reactions. However, in many instances, such carbonates are relatively expensive to prepare. Metal alkyl carbonates, such as sodium methyl carbonate having the formula CH₃OCOONa, are also useful organic intermediates for various synthesis reactions. However, the sodium-bearing carbonates such as sodium methyl carbonate are particularly expensive and somewhat hazardous to prepare by conventional procedures which involve the use of relatively pure sodium metal. Thus, it is conventional to prepare sodium methyl carbonate by first contacting methyl alcohol with metallic sodium to obtain sodium methoxide having the structural formula CH₃ONa, and then reacting the methoxide with carbon dioxide to provide the desired sodium alkyl carbonate.

Therefore, it would be desirable to provide a simplified economical method of preparing intermediates which could be readily converted to dialkyl carbonates, metal-bearing alkyl carbonates and the like. Such intermediates should be capable of being prepared in high yield in a relatively short period of time utilizing readily available inexpensive, safe constituents.

Accordingly, it is the principal object of the present invention to provide improved intermediates for the preparation of carbonyl group-containing products.

It is also an object of the present invention to provide a method of preparing valuable intermediates useful in the preparation of dialkyl carbonates and other carbonyl group-bearing organic products.

It is a further object of the present invention to provide improved intermediates which are readily reactable with a wide variety of reagents to provide useful carbonate-type end products, and a method of making said end products.

The foregoing and other objects are accomplished, in accordance with the present invention, by providing intermediates which can be used in the preparation of dialkyl carbonates, metal alkyl carbonates, and other useful end products. The new and useful intermediates are prepared in high yield in accordance with the present method through the use of readily available, inexpensive and relatively safe constituents. Moreover, new and useful end products can be prepared from selected intermediates in high yield, in accordance with one embodiment of the method.

More specifically, the present method involves the preparation of adducts (intermediates) consisting essentially of selected tertiary amine, selected alkanol and carbonyl sulfide or carbon dioxide. Carbonyl sulfide-containing adducts can then be oxidized in a selected manner to desired dialkyl carbonates, with by-product formation of sulfur and water, in accordance with one embodiment of the present method. Such oxidization reaction with oxygen is carried out in the presence of a selected agent, which may comprise a selected water adsorber and/or an oxidizing agent, in order to obtain a suitable yield of the product and, in the case of the oxidizing agent, to further reduce the required time for carrying out the oxidation reaction to completion. If desired, the oxidizing agent can be utilized as the sole oxidizing means.

As a specific example, 90 gm. of trimethylamine are dissolved in 300 ml. of absolute methanol to which are then added 200 gm. of anhydrous calcium sulfate as a water adsorber. The resulting mixture is then contacted with carbonyl sulfide gas by bubbling the gas through the mixture over a period of 30 minutes at about 25° C. At the end of this time approximately 80 gm. of the carbonyl sulfide have been dissolved in the solution and the desired adduct has been formed by reaction between the carbonyl sulfide, the trimethylamine and the methanol. This adduct, or intermediate as it may be termed generally, is directly converted to dimethyl carbonate by selected oxidation at low temperature while the adduct is still present in the methanol solution. The oxidation is carried out in a stirred autoclave at 25° C. under an oxygen pressure of 60-75 p.s.i.g. for a period of 3 hours while the calcium sulfate is still present in the adduct-containing solution. A yield of dimethyl carbonate is obtained which is about 35% of theoretical. In order to isolate dimethyl carbonate from the remaining constituents after the oxidation reaction, the solution is filtered to remove precipitated free sulfur and calcium sulfate, and the resulting filtrate is then distilled to remove the methanol from the dimethyl carbonate.

As a second specific example, trimethyl amine is dissolved in methanol and contacted with carbon dioxide gas by bubbling the gas therethrough for a period of about one-half hour at about 50° C. and atmospheric pressure, until trimethyl ammonium methyl carbonate is produced, which compound is believed to have the structural formula

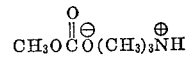

This intermediate could then be readily converted into a desired metal derivative of methyl carbonate.

Further features of the present invention are more particularly set forth in the following detailed description.

In accordance with the present invention, tertiary amine selected from the group consisting of those aliphatic amines and cyclic and heterocyclic amines each of which contains 3–12 carbon atoms, each radical thereof containing 1–10 carbon atoms, is reacted with alkanol selected from the group consisting of methanol, ethanol, n-propanol, isopropanol and mixtures thereof and either carbonyl sulfide or carbon dioxide to form an intermediate. In the case of carbonyl sulfide-containing intermediates, such intermediates can then be oxidized in a novel manner to desired dialkyl carbonate end products. The intermediates are believed to be carbonates (in the case of $CO_2$-containing intermediates) or thiol carbonates (in the case of COS-containing intermediates). Such intermediates can be characterized as substituted ammonium carbonate-type compounds having the general formula

where A is selected from the group consisting of $CO_2$ or COS, where R, R' and R'' are each selected from alkyl, substituted alkyl and other suitable aliphatic, cyclic or heterocyclic amine derived redicals, and where R''' is selected from suitable alkyl and substituted alkyl alkanol derived radicals.

The tertiary amine used in forming the intermediate or adduct readily reacts with the alkanol and carbonyl sulfide or carbon dioxide to form the intermediate or adduct. Amines which fall outside the limits specified above do not react readily and/or rapidly enough in forming the adduct to be significant commercially, or do not react at all to form the adduct. The tertiary amine usually is a hydrocarbon amine of relatively low molecular weight and is one which is capable of being readily dispersed or dissolved in the alkanol. A number of tertiary amines are particularly suitable for such purposes. In this regard, one such amine is trimethylamine. A second suitable amine is triethylene diamine, also known as 1,4-diazobicyclo (2.2.2) octane, or DABCO which has the structural formula

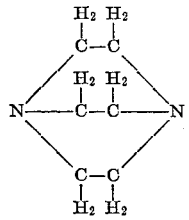

A third suitable tertiary amine is 1-azabicyclo (2.2.2) octane which has the structural formula

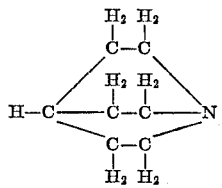

Another suitable tertiary amine is 1-azabicyclo-(3.3.1) nonane having the structural formula

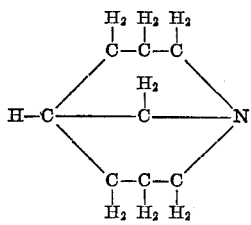

Further suitable tertiary amines, for the purposes of the present method include, but are not limited to the following: N,N-dimethyldecylamine, N-methylazolidine, N-methyl piperidine, pyrazine, isothioazole, tri-n-butylamine, triethylamine, tri-n-propylamine, dimethyl ethyl amine, dimethylpropylamine, dimethylbenzylamine, pyridine, etc. As described, the tertiary amine readily reacts with the selected alkanol and carbonyl sulfide or carbon dioxide under the conditions specified herein to form an intermediate or adduct which is oxidizable by the present method, in the case of COS-containing adducts, to the desired dialkyl carbonate end product in the presence of further amounts of the alkanol, or which can be converted to other suitable end products such as metal derivatives of carbonates. Selection of additional specific amines suitable for the present purpose can readily be made, in accordance with the foregoing criteria and general formula, by those skilled in the art.

The alkanol utilized in the present method for the formation of a suitable intermediate or adduct is selected from the described group and is sufficiently reactive with the tertiary amine and carbonyl sulfide or carbon dioxide to readily form the adduct or intermediate. Alkanols falling outside the group are specified unsatisfactory because of partial or total inability to form the desired adduct under the adduct forming conditions. The desired adduct and intermediate is, as previously indicated, one from which the desired end products such as alkyl carbonates (in the case of COS-containing adducts) can be readily obtained.

The alkanol does not have more than 3 carbon atoms. During the formation of the intermediate or adducts, the alkanol contributes one alkoxy radical to each adduct. In the case of COS-containing adducts, if the adduct is then oxidized in accordance with the present method in the presence of excess alkanol, such alkanol contributes another alkoxy radical, whereby dialkyl carbonate is formed. Accordingly, any suitable concentration of the alkanol can be used which is sufficient to not only act as a solvent or dispersant for the tertiary amine, adduct formed therefrom with carbonyl sulfide or carbon dioxide, but also is solvent or dispersant for the COS. Moreover, in the case where it is desired to convert a COS-containing adduct to dialkyl carbonate, additional amounts of alkanol must be present during the oxidation step in order to furnish the required additional alkoxy radical for the dialkyl carbonate and optionally to act as solvent or dispersant for the system.

For example, when about molar concentrations of carbonyl sulfide and tertiary amine are used, it is desirable that at least one mole of the alkanol be present so to form about one mole of the intermediate. Moreover, a sufficient additional amount of alkanol should be present in order to act as a solvent or dispersant for such adduct or intermediate, tertiary amine and COS. Moreover, another mol of the alkanol may also be present over and above the previously described amounts so as to be available for entering into a subsequent oxidation reaction, whereby the formation of the dialkyl carbonate can be accomplished. In such event, there may also be present excess amounts of the alkanol sufficient to act as a solvent or dispersant for the system. Accordingly, the present method can be carried out utilizing a considerable excess concentration of the alkanol.

The third reagent utilized in the formation of the adduct is either carbonyl sulfide or carbon dioxide. Such reagent can be used in either gaseous or liquid form. If used in liquid form, the carbon dioxide or carbonyl sulfide will be under a considerable pressure. For example, liquid carbonyl sulfide or carbon dioxide can be introduced slowly into a suitable tertiary amine-alkanol solution or dispersion while the solution or dispersion is under superatmospheric pressure in a stirred autoclave or the like. For most purposes, gaseous carbon dioxide or carbonyl sulfide is preferred. Thus, this reagent can be bubbled through a suitable tertiary amine-alkanol solution or dispersion or can be provided as a blanket over such solution or dispersion. In such instance, it is preferred to provide violent agitation of the solution or dispersion in order to maximize surface area contact with the gaseous reagent. One preferred technique is to contact the solution or dispersion with carbonyl sulfide or carbon dioxide gas in a stirred autoclave. Any desired amount of such gaseous reagent can be added to the solution or dispersion up to the limits of solubility therein. However, it is believed that the concentration of carbonyl sulfide or carbon dioxide participating in the formation of the adduct or intermediate is about equimolar with that of the tertiary amine and the alkanol so that in the usual instance only about that concentration of carbonyl sulfide or carbon dioxide is introduced and/ or absorbed into such solution or dispersion.

Preferably, the adduct-forming reaction is carried out under essentially anhydrous conditions, utilizing essentially anhydrous reagents, although this is not absolutely necessary. Moreover, the oxidation which forms a part of one method in accordance with the present invention can also be carried out under essentially anhydrous conditions as, for example, by utilizing a water adsorber. However, such oxidizing step can also be carried either in the essentially anhydrous or hydrous state in the presence of an oxidizing agent. Although it is preferable under such circumstances to have initially essentially anhydrous conditions, it is not necessary and such conditions usually are not maintained in the absence of a water adsorber.

In accordance with the present method, the adduct which consists of the tertiary amine, alkanol and carbonyl sulfide, as previously described, is formed by dissolving or dispersing a suitable concentration of the tertiary amine in the alkanol and contacting the resulting tertiary amine-alkanol solution or dispersion with carbonyl sulfide or carbon dioxide, either in liquid or gaseous form. For maximum yield, it is preferred that the contacting be carried out and maintained until the concentration of carbonyl sulfide or carbon dioxide adsorbed in the solution or dispersion is sufficient to react with substantially all of the tertiary amine and with the alkanol to form the desired adduct in as high a yield as possible. Such introduction or contacting of the carbonyl sulfide or carbon dioxide with the tertiary amine-alkanol solution or dispersion usually can take place relatively rapidly, for example, within about 30 minutes or so, where the carbonyl sulfide or carbon dioxide is present as a gas and is bubbled through such solution or dispersion. Treatment times of about 10-120 minutes have been found to be suitable, as well as other treatment times.

The adduct-forming or intermediate-forming reaction, can be characterized generally as follows:

$$R'''OH + COS + RR'R''N \longrightarrow R'''OC\overset{O}{\overset{\|}{O}}\overset{\ominus}{S}RR'R''\overset{\oplus}{NH}$$

or $$R'''OH + CO_2 + RR'R''N \longrightarrow R'''OC\overset{O}{\overset{\|}{O}}\overset{\ominus}{O}RR'R''\overset{\oplus}{NH}$$

It should be noted that both the adduct-forming reaction and a subsequent oxidizing step must be carried out at relatively low temperatures. This is essential in order to preserve a maximum yield of desired product. In this regard, the temperature which is used during the adduct-forming reaction should not exceed about 50° C. and preferably not exceed about 25° C. Temperatures below about 0° C. substantially decrease the reaction time so that for practical purposes, the temperature range for the adduct-forming reaction is about 0° C.–50° C. and preferably about 0° C.–25° C. In any event, the upper limit of temperature is that temperature which results in substantial inhibition of stable formation of the adduct. Thus, excessive temperatures favor loss of yield of the adduct by heat decomposition thereof and are to be avoided.

It will be understood that, if desired, the adduct can be separated, as by freezing the adduct out at e.g. −50° C., from the alkanol solution or dispersion and then can be stored and can be recontacted later with a suitable concentration of the same or different alkanol before and during any oxidation step or other treatment which it may be desired to carry out. Ordinarily, however, there usually is no advantage to separation of the adduct from the alkanol if conversion of the adduct is desired, since most additional treatments involving such adducts will require their solution or dispersion in alkanol.

As an example of a typical adduct-forming reaction involving $CO_2$, triethyl amine is reacted with $CO_2$ at 30° C. for 30 minutes in methanol to provide an adduct which may be characterized as triethylammonium o - methyl carbonate, i.e.

As an example of a typical adduct-forming reaction involving COS, ethyl dimethyl amine is reacted in ethyl alcohol with COS for 30 minutes at 25° C. to provide an adduct which may be characterized as ethyl dimethyl ammonium o-ethyl thiolcarbonate, i.e.

The present method also includes reaction of the thus-formed intermediate to form desired end products. Thus, COS-containing intermediates can be reacted to replace the tertiary amine (tri-substituted ammonium radical) with material selected from the group consisting of alkoxy radicals and substituted alkoxy radicals derived from a further quantity of the same alkanol as that in which the intermediate was formed. Although not a part of the present invention, by way of illustration of the utility of both the COS-containing adducts and the $CO_2$-containing adducts formed as previously described, both such types of adducts can be used to form metal derivatives of carbonates. Thus, the intermediate, is generally characterized as follows:

where A is $CO_2$ or COS and R, R', R" and R''' are as previously described, can be reacted with an inorganic salt (such as an alkanol-soluble salt) of the metal of the desired end product. This reaction can be characterized as follows:

R'''OANHRR'R" + XY (inorganic salt) →
R'''OAX + RNR'R" + HY

As a specific example, triethyl ammonium o-methyl carbonate can be reacted in methanol at 30° C. for 30 minutes with calcium chloride to provide calcium methyl carbonate as follows:

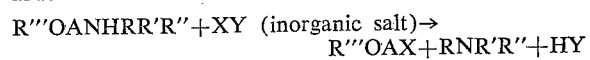

The products can then be fractionally distilled.

As another example, calcium ethyl thiolcarbonate having the structural formula

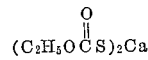

can be prepared by reacting calcium chloride and triisopropyl ammonium o-ethyl thiolcarbonate in a suitable alcohol (ethyl alcohol or the like) at 20° C. and then separating the products. The isopropyl ammonium o-ethyl thiolcarbonate itself can be prepared, for example, by reacting triisopropyl amine in ethyl alcohol with COS for 30 minutes at 25° C.

The metal organic carbonates are useful for a variety of purposes. For example, those metals which are catalytic in action can be readily incorporated into the carbonates, which carbonates thereupon act as carriers for the metals. Such carbonates in most instances readily decompose by reaction with water to form inorganic carbonates of the metal, an alcohol and a gas ($CO_2$ or COS).

As a further example, calcium ethyl carbonate having the structural formula

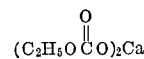

can be prepared by, first reacting a suitable tertiary amine in ethyl alcohol with carbon dioxide and then reacting the product in alcohol with an alcohol-soluble inorganic calcium salt. Thus, triisopropyl amine can be reacted in ethyl alcohol at 20° C. for 15 minutes with $CO_2$ gas bubbled therethrough. This reaction is as follows:

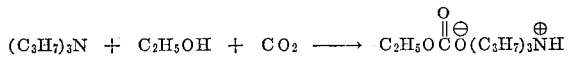

Thus, the product, triisopropyl ammonium o-ethyl carbonate, can then be reacted in ethyl alcohol with calcium chloride, at 25° C. as follows:

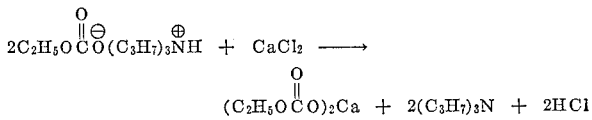

The products can be separated by filtration to provide pure calcium ethyl carbonate in powder form. This carbonate, upon addition to water, breaks down into ethyl alcohol, carbon dioxide (as bubbles) and calcium carbonate, as follows:

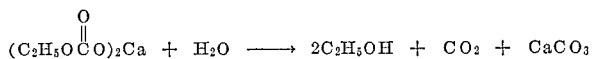

Accordingly, the calcium ethyl carbonate can be used as a dry powder source of a sterilizing medicinal (ethyl alcohol). The calcium carbonate settles out of the water solution. Similarly, the dry powder sodium ethyl carbonate, prepared by the present method (for example, reaction of NaSH with triisopropyl ammonium o-ethyl carbonate), will yield ethyl alcohol and sodium carbonate when added to water:

The sodium ethyl carbonate is also a suitable dry powder source of the medicinal, ethyl alcohol.

Dialkyl carbonates can be prepared from the COS-containing adducts obtained by the present method. In this regard, a COS-containing adduct is oxidized, in accordance with the present method, to dialkyl carbonate, with concomitant precipitation of free sulfur and formation of water. The tertiary amine of the adduct is released therefrom and is recoverable. The alkanol dispersant or solvent containing the adduct replaces the tertiary amine during the oxidation reaction so as to complete the formation of the dialkyl carbonate. The oxidation step is carried out under controlled low temperature conditions sufficiently low to prevent the elaboration or release of substantial quantities of carbonyl sulfide gas by heat decomposition of the adduct during such oxidation, which breakdown would adversely affect the ultimate yield of desired dialkyl carbonate product. Accordingly, the maximum temperature at which the oxidation step can be operated will somewhat vary, depending upon the particular adduct involved, and the particular alkanol which is present as the solvent or dispersant but is not in excess of about 100° C. In most instances, the temperature range for the oxidation reaction will be from about 0° C. to about 100° C. and preferably about 0° C.–50° C. Temperatures lower than about 0° C., as with the adduct-forming or intermediate-forming step, tend to substantially reduce the rate of the reaction, and although they can be used, are generally undesirable, especially for commercial operations.

The oxidation reaction can be characterized as follows:

R'''OCOSNRR'R''H+R'''OH+½$O_2$→
R'''OCOOR'''+$H_2O$+NRR'R''

In a more general way, the oxidation reaction can be viewed as being included in an overall reaction also embracing the adduct formation and between the amine, carbonyl sulfide and alcohol wherein two molar equivalents of alkanol participate per molar equivalent of carbonyl sulfide and per molar equivalent of tertiary amine, all three reagents interacting to form the desired dialkyl carbonate. This general reaction can be typified as follows:

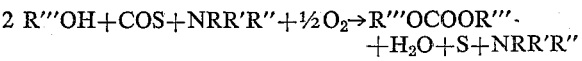

The oxidation reaction can be carried out in any suitable manner at low temperature to produce the desired results, provided that a selected agent is present together with the adduct or intermediate in the alkanol solution or dispersion. Such agent can comprise a water adsorber which is insoluble in the adduct-containing solution or dispersion and which is essentially non-reactive, under the oxidizing conditions of the present method, with the adduct, the solvent or dispersant i.e. the alkanol, and the tertiary amine, as well as the carbonyl sulfide, sulfur and dialkyl carbonate. For such purposes, selected anhydrous inorganic salts can be used, such as anhydrous calcium sulfate, anhydrous sodium sulfate and anhydrous zinc sulfate. Alternatively, other water adsorbers can be used, such as finely divided molecular sieve material (synthetic and natural zeolites), various clays, such as attapulgite clay, selected bentonites and the like known water adsorbers. Such water adsorbers should be present in concentrations sufficient to adsorb at least a substantial proportion of the water produced and preferably substantially all of the water produced during oxidation of the adduct. Accordingly, for example, a concentration of about 50–250 gms. of water adsorber is usually employed in a typical situation per mol of adduct. Such water adsorber can be present in the solution or dispersion during the adduct-forming reaction or can be placed into the solution or dispersion at any time immediately before or during the oxidation reaction, preferably before any substantial part of the oxidation reaction is initiated and certainly before the oxidation reaction is completed. The water adsorber results in a substantial yield of desired dialkyl carbonate product. Thus, it drives the oxidation reaction to substantial completion by adsorbing from the system one of the products of the reaction, water.

It has also been found that in place of or in addition to the described water adsorbers, selected oxidizing agents can be employed in the adduct-containing solution or dispersion during the oxidation step. Such oxidizing agents are selected oxides, hydroxides, methoxides and salts which accelerate the rate of oxidation of the adduct and which also provide a substantial yield of desired dialkyl carbonate product. Such oxidizing agents preferably are soluble to some extent in the adduct-containing solution or dispersion. Moreover, the cations of the oxidizing agent readily undergo a change in valence. For such purposes, depending upon the solubility of the particular oxidizing agent and the particular alkanol solvent or dispersant bearing the adduct, various inorganic salts such as sulfides, halides, nitrates and sulfates of such valence-changing metals, as iron, nickel, cobalt, copper, mercury, palladium, platinum and gold can be used, as well as those salts of other metals which act in a similar manner to afford a substantial yield of desired product and an increase in the rate of the oxidization reaction. Moreover, the oxides, hydroxides and methoxides of the indicated valence-changing metals can be used, for example, copper oxide.

Also, Example XV below shows that the elemental form of a valence changing metal can be employed as an oxidizing agent in our process.

Specific non-limiting examples of suitable oxidizing agents for the purposes of the present method, depending upon the particular alkanol which is present as the solvent or dispersant, are the following: cupric sulfide, cupric oxide, cupric hydroxide, cobalt oxide, ferric chloride, nickelic chloride, cobaltic chloride, cupric sulfate, cobaltic sulfate, cupric nitrate and cobaltic nitrate. The oxidizing agent selected is normally employed, and usually in a relatively small concentration, for example from about 1% to about 15%, by weight of the adduct, although other suitable concentrations of the oxidizing agent can be used, as more particularly described hereinafter. Such concentrations provide the desired results in terms of a substantial yield of product and a substantial reduction in oxidation time over that when oxygen or air alone is used. Selection of the particular oxidizing agents for use in the oxidizing reaction will be well within the skill of those versed in the art, in accordance with the foregoing criteria.

Now referring again more specifically to the basic oxidation reaction, such reaction is carried out at a low temperature, as previously described, and in any convenient and suitable manner effective for converting the adduct or intermediate to the desired dialkyl carbonate. In this regard, for example, the adduct-containing alkanol solution or dispersion can be allowed to stand exposed to oxygen or air at a suitable temperature of, for example, about 25° C. to about 30° C. and at atmospheric pressure over a period of for example one to four weeks or the like.

However, it is preferred to accelerate the oxidizing step in order to make it more commercially practical. For such purposes, such step can be carried out, for example, by placing the adduct-containing alkanol solution or dispersion, also containing the selected agent which may be a water adsorber and/or oxidizing agent, in the solution or dispersion in an autoclave, preferably a stirred autoclave, and subjecting such solution or dispersion to oxidation under an oxygen blanket at super-atmospheric pressure of, for example, 40–75 p.s.i.g. over a suitable period of time, for example, from about 2 to about 24 hours. Ordinarily, where a water adsorber is present, the oxidation step can be substantially completed within about 24 hours. However, the oxidation time, as previously indicated, can be drastically shortened if an oxidizing agent, as specified above, is present in an effective concentration, since the oxidizing agent tends to accelerate the rate of oxidation. For example, where an oxidizing agent is present in an effective minor concentration of for example, about 1–15%, by weight of adduct, the oxidation step can usually be completed within about 1–4 hours and in some instances in even less time. Moreover, when metal compound selected from the group consisting of the halides, sulfates, nitrates, methoxides, hydroxides, oxides and sulfides of a higher valence form of a metal selected from the group consisting of Fe, Ni, Co, and Cu is present in a much larger concentration, that is, in a concentration about molar equivalent with that of the adduct, the oxidizing agent not only improves the yield of dialkyl carbonate and greatly decreases reaction time, but also obviates the necessity of using a separate source of oxygen for the oxidation reaction. Thus, with an about molar equivalent amount of the higher valent state metal compound present in the adduct-containing solution or dispersion, the oxidation reaction occurs both in the presence and absence of an oxygen or air blanket. In the presence of the higher valent state metal compound, no resort need be made to the use of oxygen or air at super-atmospheric pressure, as in a stirred autoclave, or allowing the solution or dispersion of the adduct to stand exposed to oxygen or air. Instead, the oxidation reaction can be carried out very rapidly at atmospheric pressure in a closed or open vessel.

The use of the higher valent state metal compound in about molar equivalent amounts i.e., with respect to the molar amount of carbonate formed, as shown in Ex. XI, also makes commercially feasible the carrying out of both the adduct-forming reaction and the oxidation reaction in a single reaction zone and in a single overall operation. Thus, a solution or dispersion can be made up of about molar equivalent amounts of a selected tertiary amine and the higher valent state metal compound in an excess concentration of the selected alkanol and this solution or dispersion can be contacted with carbonyl sulfide gas, as by bubbling such gas therethrough at a temperature not in excess of about 50° C. While such contacting is going on, as over a 30 minute period, the COS-containing adduct is being formed and as soon as it is formed, it is oxidized by the higher valent state metal compound to the desired dialkyl carbonate. By the time an amount of COS gas molar equivalent to that of the tertiary amine has been absorbed into the solution or dispersion the oxidation reaction has also occurred to a substantial extent. After a short holding time (e.g. 15–30 minutes), the solution or dispersion is then ready for fractionation or other final treatment in order to separately recover the dialkyl carbonate and the tertiary amine from the excess alkanol, precipitated sulfur, water and the higher valent state metal compound. It should be noted, however, that although all the above can be carried out in a single reaction zone at not above about 50° C. and in a short period of time, e.g. about 30–60 minutes, such still involves two separate reactions, namely, first the adduct-forming reaction and then the oxidation reaction. It will be readily understood that such simplified procedure lends itself to commercial application, since overall processing time is usually reduced, as are equipment costs.

The final treatment of the dispersion or solution containing the desired end product, dialkyl carbonate, can be any suitable treatment. For example, the total product after oxidation can be treated by first filtering off the liquid portion from the solids, such as the water adsorber and precipitated sulfur, and then fractionally distilling the filtrate at relatively low temperature, as by vacuum distillation or the like. It is permissible to employ a somewhat higher temperature during such distillation procedure than that specified above for the adduct-forming and oxidizing steps. However, it is still preferred to conduct the distillation at relatively low pressure and temperature in order to minimize any adverse effect which might occur with respect to the yield of the desired end product, dialkyl carbonate.

Further features of the present invention will be apparent from the following examples.

EXAMPLE I

In a first run, a total of 45 gm. of trimethylamine are dissolved in 300 ml. of absolute methanol at 25° C. and the resulting trimethylamine-methanol solution is then subjected to carbonyl sulfide by bubbling carbonyl sulfide gas therethrough for a period of 30 minutes at 30° C. until approximately 40 gm. of the carbonyl sulfide gas have been absorbed in the trimethylamine-methanol solution. At the end of this contact period, the solution contains dissolved therein an adduct or intermediate consisting essentially of the trimethylamine-methanol-carbonyl sulfide.

About 100 gm. of anhydrous sodium sulfate are then added to the adduct-containing solution and such solution is then transferred to a stirred autoclave and is oxidized over a 24 hour period with stirring thereof at 53° C. under an oxygen pressure of 60 p.s.i.g. Following the oxidation step, the resulting solution is withdrawn from the autoclave, precipitated free sulfur and the sodium sulfate are vacuum filtered therefrom and the resulting filtrate is subjected to fractional distillation under vacuum at a temperature of about 20° C. to recover separately trimethylamine, excess methanol, and the desired end product dimethyl carbonate. The trimethylamine is recovered in an amount substantially equal to the initial concentration of the trimethylamine in the methanol solution during the adduct-forming step, and such trimethylamine is ready for reuse in the present method. The dimethyl carbonate is obtained in a yield of about 25% of theoretical and is suitable as a reagent in a variety of syntheses. It is also valuable as a solvent and reaction medium.

When the same oxidation reaction is carried out in a second run under identical conditions to those of the first run except for the absence of any water adsorber or selected oxidizing agent, no detectable yield of dialkyl carbonate is obtained.

In a third run under the same conditions as those of the first run, except for the substitution of 100 gm. of anhydrous calcium sulfate in place of the 100 gm. anhydrous sodium sulfate, the dimethyl carbonate is obtained in a yield of about 35% of theoretical.

In a fourth parallel run, 100 gm. of anhydrous calcium sulfate and 1 gm. of anhydrous cobalt chloride, $CoCl_2$, are added to the adduct-containing solution immediately before oxidation in the autoclave, and a total oxidation time of only one hour is used. A yield of dimethyl carbonate of about 75% of theoretical is obtained.

In a fifth parallel run, 1 gm. of anhydrous cobalt chloride, $CoCl_2$, is used in place of the mixture of cobalt chloride and calcium sulfate of the third run. The dimethyl carbonate is again obtained in a yield of about 75% of theoretical. This illustrates that at least in some instances the oxidizing agent alone is as effective as a mixture of both the oxidizing agent in the same amount and an effective concentration of the water adsorber.

In a sixth parallel run, 200 gm. of attapulgite clay are used in place of the cobalt chloride of the fourth run. A yield of approximately 20% of theoretical of dimethyl carbonate is obtained.

In a seventh parallel run, 2 gm. of anhydrous cupric sulfate are substituted for the attapulgite clay. A yield of dimethyl carbonate of about 76% of theoretical is obtained.

In an eighth parallel run, 3 gm. of nickel bromide are substituted for the cupric nitrate. The yield of dimethyl carbonate is about 76% of theoretical.

EXAMPLE II

The method of Example I is carried out, but substituting triethylenediamine (DABCO) in a 102 gm. amount for the trimethylamine. The triethylene diamine is placed in 300 ml. of methanol, to which are added 60 gm. of carbonyl sulfide gas. In parallel runs, similar to those of Example I, similar results are obtained, in terms of yields of dimethyl carbonate, to those obtained in the parallel runs of Example I.

Thus, for example, in the first run of Example II, 200 gm. of anhydrous sodium sulfate are used, and in the second run no selected agent (oxidizing or adsorber), while in the third run 200 gm. of anhydrous calcium sulfate are used. In the fourth run, 200 gm. of anhydrous calcium sulfate and 2 gm. of anhydrous cobalt chloride, $CoCl_2$, are used. In the fifth run, 2 gm. of anhydrous cobalt chloride, $CoCl_2$, are used and in the sixth run 200 gm. of attapulgite clay are used. In the seventh run 3 gm. of anhydrous cupric chloride are used and in the eighth run 5 gm. of nickel bromide are used. In the first run, the yield of dimethyl carbonate is 25% of theoretical, in the second run 0%, in the third run 35% of theoretical, in the fourth run 75% of theoretical, in the fifth run 75% of theoretical, in the sixth run 35% of theoretical, in the seventh run 75% of theoretical, and in the eighth run 75% of theoretical. Moreover, as in Example I, the requisite time for completion of the oxidation step is reduced in the case of the use of the oxidizing agent alone or with the anhydrous water adsorber from approximately 24 hours to approximately 1 hour.

EXAMPLE III

The method of Example II is carried out including all runs and parallel runs, except that 1-azabicyclo (2.2.2) octane in a 101 gm. amount is substituted for the 102 gm. amount of DABCO. Results comparable to those in Examples I and II are obtained, clearly indicating that the present method is suitable for preparing dimethyl carbonate in high yield.

In additional parallel runs, the indicated weights of the following amines are substituted, with the following results:

N,N-dimethyldecylamine 185 g.: 20% yield of dimethyl carbonate

N,N-dimethylbenzylamine 135 g.: 40% yield of dimethyl carbonate

N-methylazolidine 85 g.: 70% yield of dimethyl carbonate

Tri-n-butylamine 195 g.: 10% yield of dimethyl carbonate

EXAMPLE IV

The method of Example III is carried out, including the parallel runs, except that 101 gm. of 1-azabicyclo (3.2.1) octane is substituted for the 1-azabicyclo (2.2.2) octane in Example III. Substantially indentical results are obtained, further indicating the present method is applicable to the preparation of dimethyl carbonate utilizing selected tertiary amine, methanol and carbonyl sulfide gas.

EXAMPLE V

The dialkyl carbonate diethyl carbonate is prepared by first dissolving 90 gm. of trimethyl amine in 300 ml. of ethanol. The resulting amine solution is then contacted for a period of 30 minutes at about 25° C. with carbonyl sulfide gas, in a stirred autoclave until approximately 60 gm. of the carbonyl sulfide are dissolved in the amine-alkanol solution. At the end of this contact period, there is present in the solution an adduct which consists essentially of the amine, alkanol and carbonyl sulfide. This adduct is present in a concentration of approximately 100% of theoretical.

To the adduct-containing solution are then added 200 gm. of anhydrous calcium sulfate, after which the solution is oxidized at 25° C. for a period of 24 hours under 75 p.s.i.g. oxygen pressure in a stirred autoclave. Following the oxidation step, the resulting oxidized solution is then filtered to remove solids, and then fractionally distilled to recover the desired end product, diethyl carbonate. The diethyl carbonate is obtained in a yield of approximately 25% of theoretical.

In a parallel run, approximately 2 gm. of cobalt chloride are substituted for the 200 gm. of calcium sulfate used in the first run and the diethyl carbonate is obtained in a yield of approximately 70% of theoretical after an oxidation period of only one hour.

EXAMPLE VI

The dialkyl carbonate di-n-propyl carbonate is prepared by first dissolving 150 gm. of triethylamine in 300 ml. of n-propanol at 25° C. and the resulting amine-alkanol solution is then contacted for a period of 20 minutes at about 25° C. with carbonyl sulfide gas, in a stirred autoclave at 50 p.s.i.g. carbonyl sulfide, until approximately 60 gm. of the carbonyl sulfide are dissolved in the amine-alkanol solution. At the end of this contact period, there is present in the solution an adduct which consists essentially of the amine, alkanol and carbonyl sulfide. This adduct is present in a concentration of approximately 100% of theoretical.

To the adduct-containing solution are then added 200 gm. of calcium sulfate (water adsorber), after which the solution is oxidized at 25° C. for a period of 24 hours under 75 p.s.i.g. oxygen pressure in a stirred autoclave. Following the oxidation step, the resulting oxidized solution is then filtered to remove solids, and then fractionally distilled to recover the di-n-propyl carbonate. Di-n-propyl carbonate is obtained in a yield of approximately 15% of theoretical.

In a parallel run, approximately 2 gm. of cupric chloride (oxidizing agent) are substituted for the 200 gm. of calcium sulfate (water adsorber) used in the first run and the di-n-propyl carbonate is obtained in a yield of approximately 70% of theoretical after an oxidation period of only one hour.

EXAMPLE VII

The dialkyl carbonate di-isopropyl carbonate is prepared by first dissolving 90 gm. of trimethylamine in 300 ml. of isopropanol at 25° C. and the resulting amine-alkanol solution is then contacted for a period of 20 minutes at about 25° C. with carbonyl sulfide gas, in a stirred autoclave at 5 p.s.i.g. carbonyl sulfide, until approximately 60 gm. of the carbonyl sulfide are dissolved in the amine-alkanol solution. At the end of this contact period, there is present in the solution an adduct which consists essentially of the amine, alkanol and carbonyl sulfide. This adduct is present in a concentration of approximately 100% of theoretical.

To the adduct-containing solution are then added 200 gm. of calcium sulfate (water adsorber), after which the solution is oxidized at 25° C. for a period of 24 hours under 75 p.s.i.g. oxygen pressure in a stirred autoclave. Following the oxidation step, the resulting oxidized solution is then filtered to remove solids, and then fractionally distilled to recover the diisopropyl carbonate. Diisopropyl carbonate is obtained in a yield of approximately 10% of theoretical.

In a parallel run, approximately 2 gm. of cobalt nitrate (oxidizing agent) are substituted for the 200 gm. of calcium sulfate (water adsorber) used in the first run and the diisopropyl carbonate is obtained in a yield of approximately 50% of theoretical.

EXAMPLE VIII

In a first test, triethylamine in 101 gm. amount is dissolved in 300 cc. of methyl alcohol and contacted with $CO_2$ by bubbling the $CO_2$ through the solution at 30° C. for one hour, that is, until the reaction is complete. The desired product, triethylammonium o-methylcarbonate is obtained in a yield at about 85%. It is then contacted at 25° C., while still in the methyl alcohol, with 200 gm. of $CaCl_2$ (the $CaCl_2$ being dissolved in the alcohol), and the triethylammonium o-methylcarbonate is substantially completely converted immediately to calcium methyl carbonate, which product is separately recovered from the solution by filtration. The calcium methyl carbonate is useful in chemical syntheses and, upon contact with water, breaks down to methyl alcohol, calcium carbonate and carbon dioxide, so that it is useful as an antiseptic, disinfectant and the like.

In a second test, trimethylammonium o-methyl thiolcarbonate is formed by the same procedure as used for the preparation of the corresponding carbonate in the first test, except that COS is substituted for $CO_2$. A yield of desired product of about 90 percent is obtained, which product, trimethylammonium o-methyl thiolcarbonate, is then substantially completely converted to calcium methyl thiolcarbonate by the procedure used in the first test.

EXAMPLE IX

The tertiary amine, trimethylamine is dissolved in 59 gm. amount in 300 cc. of ethanol and reacted with $CO_2$ gas bubbled therethrough for 25 minutes at 35° C. The product, trimethylammonium o-ethyl carbonate, is obtained in 90 percent yield and is reacted in the ethanol with 90 gm. of $CaCl_2$ (dissolved in the ethanol) at 25° C. to produce 90 percent of theoretical yield of calcium ethyl carbonate, which product is separated from trimethylamine and other constituents in the ethanol by filtration. In a subsequent test carried out in the same manner, except that COS is substituted for $CO_2$, trimethylammonium o-ethyl thiolcarbonate is formed in a yield of about 90 percent of theoretical, and is converted (in a yield of 90 percent) to calcium ethyl thiolcarbonate by the previously described procedure.

EXAMPLE X

Tripropylamine in 143 gm. amount is dissolved in 300 cc. of methanol, and $CO_2$ is bubbled therethrough at 35° C. for 1 hour. The product, tripropylammonium o-methyl carbonate, is obtained in about 95 percent (of theoretical) yield. This product in methanol is reacted with 56 gm. of NaSH at 30° C., after which the solution is refluxed for 1 hour and then fractionally distilled to obtain about 90 percent of theoretical yield of sodium methyl carbonate.

In a parallel test, the same reactions as described are carried out, except that COS is substituted for $CO_2$. Tripropylammonium o-methyl thiolcarbonate is obtained in a yield of about 90 precent of theoretical and this product is converted to sodium methyl thiolcarbonate in a yield of about 80 percent of theoretical.

EXAMPLE XI

The dialkyl carbonate, dimethyl carbonate, is prepared by first dissolving 180 gm. of trimethylamine and 67 gm. of cupric chloride in 300 ml. of methanol. The resulting amine-alcohol-cupric chloride mixture is then contacted for a period of about 5 minutes at about 25° C. with carbonyl sulfide gas in a stirred autoclave at 50 p.s.i.g. carbonyl sulfide until 15 gm. of carbonyl sulfide are taken up by the amine-alcohol-cupric chloride mixture. Stirring is then continued for one hour at 25° C. The resulting product mixture is then fractionally distilled under vacuum to give a 90% yield of dimethyl carbonate. The oxidation reaction utilizing the cupric chloride is characterized as follows:

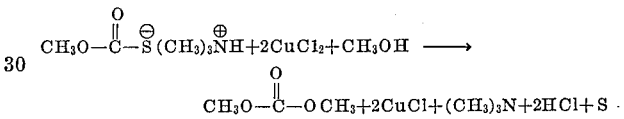

$$CH_3O-\overset{O}{\underset{\|}{C}}-O\,CH_3+2CuCl+(CH_3)_3N+2HCl+S$$

In a parallel run, 65 gm. of cobaltic chloride, $CoCl_3$, are substituted for the 67 gm. of cupric chloride. The yield of dimethyl carbonate is identical.

EXAMPLE XII

Cupric methoxide was prepared by dissolving 3 gm. of cupric chloride in 150 ml. of methanol and adding the resulting solution to 2.4 gm. of sodium methoxide in 150 ml. of methanol. Sodium chloride precipitated from solution, leaving the cupric methoxide in the methanol. The resulting methanol solution of cupric methoxide was introduced into a 1 liter stirred autoclave and 59 gm. of trimethylamine and 60 gm. of carbonyl sulfide were then added while the temperature was kept at 25° C. Stirring was then started and oxygen was introduced on demand at 50 p.s.i.g. while the temperature was held at 25° C. In 45 minutes all of the carbonyl sulfide had been converted and the weight of dimethyl carbonate found in the resulting solution amounted to a 65% yield based on the COS used.

EXAMPLE XIII

Cupric hydroxide was prepared in the following manner. Six grams of cupric chloride was dissolved in 100 ml. of water and 100 ml. of a 10% sodium hydroxide water solution were added to the resulting solution. Cupric hydroxide precipitated and was washed free of chloride by water-washing. The resulting cupric hydroxide (3 gm.) was introduced into a 1 liter stirred autoclave with 300 ml. of anhydrous methanol and the autoclave closed. Fifty-nine grams of trimethylamine and 60 gm. of carbonyl sulfide were added with the temperature kept at 25° C. Stirring was started and oxygen was introduced on demand at 50 p.s.i.g., while the temperature was held at 25° C. In 45 minutes, complete conversion of the carbonyl sulfide had occurred and the weight of dimethyl carbonate produced amounted to a 60% yield based on the carbonyl sulfide used.

EXAMPLE XIV

To a 1 liter stirred autoclave were added 3 gm. of cupric oxide and 300 ml. of anhydrous methanol. The autoclave was closed and 59 gm. of trimethylamine and 60 gm. of carbonyl sulfide were introduced with the temperature held at 25° C. Stirring was started and oxygen was introduced on demand at 50 p.s.i.g., while the temperature was held at 25° C. In 45 minutes, complete conversion of the carbonyl sulfide had occurred and the weight of dimethyl carbonate found in the product solution amounted to a 70% yield based on the carbonyl sulfide used.

EXAMPLE XV

A procedure identical with that of Example XIV was carried out, except that 3 gm. of cuprous oxide was substituted for the cupric oxide. The yield of dimethyl carbonate was 75%. An additional identical run was carried out, except that 5 gm. of copper powder was used and the reaction mixture was stirred for one hour before the oxygen was introduced. The yield was 50% dimethyl carbonate.

EXAMPLE XVI

To a 1-liter stirred autoclave were added 17.2 g. of cupric sulfide and 300 ml. of anhydrous methanol. The autoclave was closed and 59 g. of trimethylamine and 60 g. of carbonyl sulfide were introduced with the temperature held at 25° C. The autoclave was stirred at 25° C. for two hours. Oxygen was then introduced on demand at 50 p.s.i.g., while the temperature was held at 20° C. In three hours, complete conversion of the carbonyl sulfide had occurred and the amount of dimethyl carbonate found in the product solution amounted to a 50% yield based on the carbonyl sulfide used.

Accordingly, the present method provides a simple, effective, relatively safe and relatively rapid way of preparing tertiary amine-alkanol-carbonyl sulfide or carbon dioxide-containing adducts. Desired dialkyl carbonates can be obtained (in the case of COS-containing adducts) by a low temperature oxidization step also in accordance with the present invention. Moreover, both the COS-containing adducts and $CO_2$-containing adducts are capable of being converted to various carbonate-containing end products. No consumption of reactants (except carbonyl sulfide and the alkanol for the preparation of dialkyl carbonates or metal derivatives of alkyl carbonates) is required, the tertiary amine being recoverable in each instance from the solution or dispersion after final treatment and in a condition for re-utilization in the present method.

Also as indicated in the foregoing examples, in order to obtain a substantial yield of dialkyl carbonate, it is necessary during the oxidation step to have present in the adduct-containing solution or dispersion an effective concentration of a water adsorber or oxidizing agent of a selected type, as previously described. If desired, both the oxidizing agent and water adsorber can be present together in the solution or dispersion.

The new adducts are formed rapidly, simply and economically in accordance with the present method and so also are the desired dialkyl carbonate end-products. The method is further characterized by high yields of product utilizing readily available reagents. Further advantages of the present method are set forth in the foregoing.

Various modifications, alterations and additions can be made in the present method, and in the conditions and reagents for the method and products thereof. All such modifications, changes, alterations and additions as are within the scope of the appended claims form a part of the present invention.

What is claimed is:
1. A method of making dialkyl carbonate, which method comprises contacting carbonyl sulfide and an alkanol selected from the group consisting of methanol, ethanol, isopropanol, n-propanol and mixtures thereof, with a tertiary hydrocarbon amine selected from the group consisting of those alkyl amines and heterocyclic amines which contain 3–12 carbon atoms at a temperature of about 0° C. to 50° C., thereby forming an adduct of said tertiary amine, said alkanol and said carbonyl sulfide, said alkanol being used in sufficient excess such that the adduct is in solution or dispersion therein, and oxidizing said adduct to yield dialkyl carbonate and precipitated free sulfur, at a temperature of about 0 to 100° C. with oxygen in the presence of (a) a water adsorber, (b) a metal compound selected from the group consisting of the halides, sulfates, nitrates, methoxides, hydroxides and oxides of Fe, Ni, Co, or Cu, or (c) metallic copper.

2. The method of claim 1 wherein the oxidation with oxygen is carried out in the presence of a water adsorber selected from the group consisting of anhydrous inorganic salts, molecular sieves and water-adsorbing clays which are insoluble in said alkanol and essentially non-reactive with said alkanol, tertiary amine, adduct, carbonyl sulfide, and precipitated sulfur under said conditions of oxidation, and wherein said water-adsorber is added in an effective water-adsorbing concentration to said adduct-containing alkanol before substantial completion of said oxidation.

3. The method of claim 2 wherein said water adsorber is selected from the group consisting of anhydrous calcium sulfate, anhydrous sodium sulfate, anhydrous zinc sulfate, a zeolitic molecular sieve, attapulgite clay, and a bentonite clay.

4. The method of claim 1 wherein the oxidation with oxygen is carried out in the presence of anhydrous cobalt chloride $CoCl_2$.

5. The method of claim 1 wherein the oxidation with oxygen is carried out in the presence of copper oxide.

6. The method of claim 1 wherein said alkanol is ethanol and wherein said tertiary amine is trimethyl amine.

7. A method of making a dialkyl carbonate which comprises adding carbonyl sulfide to a mixture comprising (a) an alkanol selected from the group consisting of methanol, ethanol, n-propanol and mixtures thereof, (b) a tertiary hydrocarbon amine selected from the group consisting of alkyl amines and heterocyclic amines containing 3–12 carbon atoms, and (c) metallic copper or a compound selected from the group consisting of the halides, sulfates, nitrates, methoxides, hydroxides, and oxides of Fe, Ni, Co, and Cu, and introducing oxygen into the resulting mixture at a temperature of 0 to 100° C.

8. A method of making a dialkyl carbonate which comprises adding carbonyl sulfide to a mixture comprising (a) an alkanol selected from the group consisting of methanol, ethanol, n-propanol and mixtures thereof, (b) a tertiary hydrocarbon amine selected from the group consisting of alkyl amines and heterocyclic amines containing 3–12 carbon atoms, and (c) a metal compound selected from the group consisting of the halides, sulfates, nitrates, methoxides, hydroxides and oxides of a higher valence form of the metals Fe, Ni, Co and Cu, in an amount equivalent to a molar amount of carbonate formed, at a temperature of 0–100° C.

References Cited
UNITED STATES PATENTS 3,114,762  12/1963  Mador et al. _____ 260—463

BERNARD HELFIN, Primary Examiner

L. DE CRESCENTE, Assistant Examiner